United States Patent
Belling et al.

(10) Patent No.: US 10,749,820 B2
(45) Date of Patent: Aug. 18, 2020

(54) SYSTEM AND METHOD FOR COLLECTING AND STORING ELECTRONIC MESSAGES OF DIFFERENT TYPES BASED ON SUBJECT MATTER

(71) Applicant: MESH01, Portsmouth, NH (US)

(72) Inventors: Lane Belling, St Anthony, MN (US); Brian James Bednarek, Rye, NH (US); Richard Pressler, Goffstown, NH (US)

(73) Assignee: MESH01, LLC, Portsmouth, NH (US)

( * ) Notice: Subject to any disclaimer, the term of this patent is extended or adjusted under 35 U.S.C. 154(b) by 0 days.

(21) Appl. No.: 15/970,936

(22) Filed: May 4, 2018

(65) Prior Publication Data

US 2019/0342234 A1 Nov. 7, 2019

(51) Int. Cl.
| | |
|---|---|
| *G06F 16/22* | (2019.01) |
| *H04L 12/58* | (2006.01) |
| *G06Q 10/10* | (2012.01) |
| *G06Q 10/06* | (2012.01) |
| *G06F 16/2455* | (2019.01) |

(52) U.S. Cl.
CPC ............ *H04L 51/02* (2013.01); *G06F 16/22* (2019.01); *G06F 16/24568* (2019.01); *G06Q 10/063* (2013.01); *G06Q 10/107* (2013.01); *H04L 51/16* (2013.01); *H04L 51/36* (2013.01)

(58) Field of Classification Search
None
See application file for complete search history.

(56) References Cited

U.S. PATENT DOCUMENTS

| | | | |
|---|---|---|---|
| 2006/0040711 A1* | 2/2006 | Whistler | H04W 24/00 455/566 |
| 2012/0089565 A1* | 4/2012 | Jackson | G06Q 10/06 707/608 |
| 2015/0347970 A1* | 12/2015 | Kirtane | G06Q 10/101 717/103 |
| 2018/0210709 A1* | 7/2018 | Bharthulwar | G06F 8/24 |

* cited by examiner

*Primary Examiner* — Sargon N Nano
*Assistant Examiner* — Christopher B Robinson
(74) *Attorney, Agent, or Firm* — Bourque & Associates

(57) ABSTRACT

Included are methods for integrating communications data by project, Analyst and Tester, without requiring the subject to be included in the communication data. The methods integrate at least two communication channels into a database by project, wherein at least one communication channel is configured to send communication data directly to the database and at least one other communication is periodically pooled in order to data transfer to the database.

17 Claims, 2 Drawing Sheets

SYSTEM AND METHOD FOR COLLECTING AND STORING ELECTRONIC MESSAGES OF DIFFERENT TYPES BASED ON SUBJECT MATTER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD

The present application relates to the integration of electronic messages across platforms into a single platform.

BACKGROUND

Electronic communications dominate in the business world. People in cubicles sitting next to each other will often use communication channels such as email or instant messaging rather than actually talking to one another. As bizarre as this behavior might seem, it serves a useful purpose because it provides a searchable record of the communications.

While it might seem bizarre to use these communication channels in an office, with people in your immediate vicinity, it becomes essential when you are working with remotely-located staff. This is especially true when you are dealing with independent contractors, who may each have his or her preferred method of electronic communication.

With so many varied means of communication, the problem becomes one of integrating all these into a single searchable database. While emails typically have a subject line that can be used to link messages, other communications such as text messages do not have subject lines; and it becomes virtually impossible to integrate the multiple message channels into a single database and tie it to a specific subject.

Therefore, there continues to be a need for a way of integrating messages from a diverse set of platforms without requiring the user of the database to specify the subject.

SUMMARY

In order to overcome the deficiencies in the prior art, systems and methods are described herein.

One aspect of the claimed invention involves methods for integrating communications data comprising for at least a first and a second communication channel into a database by project wherein the first communication channel is configured to send communication data directly to the database and the second communication is periodically pooled in order to initiate data transfer to the database.

The method further comprises initiating a project within a system, associated with an Analyst, by sending a project initiation message on at least the first and second communication channel to at least a first and second Tester, wherein everyone has a separate communication address on each of the first and second communication channels; transmitting a copy of all the communication on the first communication channel between the Analyst and either of the at least first or second Testers directly to the database and linking all of these communications with the first project; periodically pooling the second communication channel for messages between the Analyst and either of the at least first or second Testers and linking all of these communications with the first project and storing the desired data from these messages in the database; combining all of the linked communication data into a message for the Analyst; querying message stream; and generating reports A further aspect involves the Analyst initiating a second project within the system, by sending a second project initiation message on the at least the first and second communication channel to the first Tester and at least a third Tester; transmitting a copy of all new communication on the first communication channel between the first Analyst and either of the first Tester or the at least third Tester directly to the database and linking all of these communications with the second project; periodically pooling the second communication channel for new messages between the first Analyst and either of the first or the at least third Tester and linking all of these communications with the second project and storing the desired data from these messages in the database; combining all of the linked communication data into a message for the Analyst; querying the message stream for data by either first or second project; and generating a report based upon the data.

An additional further aspect involves having a second Analyst initiating a third project within the system, by sending third project initiation message on the at least the first and second communication channel to the at least first Tester and second Tester; transmitting a copy of all new communication on the first communication channel between the second Analyst and either of the at least first Tester or second Tester directly to the database and linking all of these communications with the third project; periodically pooling the second communication channel for new messages between the second Analyst and either of the at least first Tester or second Testers and linking all of these communications with the third project and storing the desired data from these messages in the database; combining all of the third projects linked communication data into a second message stream viewable by the second Analyst; querying the second Analyst message stream; and generating a report based upon the data.

These and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DETAILED DESCRIPTION

The instant devices and approach provide a way of integrating at least a first and a second communication channel into a database by project, without the user needing to specify the subject, wherein the first communication channel is configured to send communication data directly to the database, and the second communication is periodically pooled in order to initiate data transfer to the database.

We will begin the detailed description by first describing the representative system architecture. Then we will turn our attention to representative system methods of using the architecture.

Figure 1:
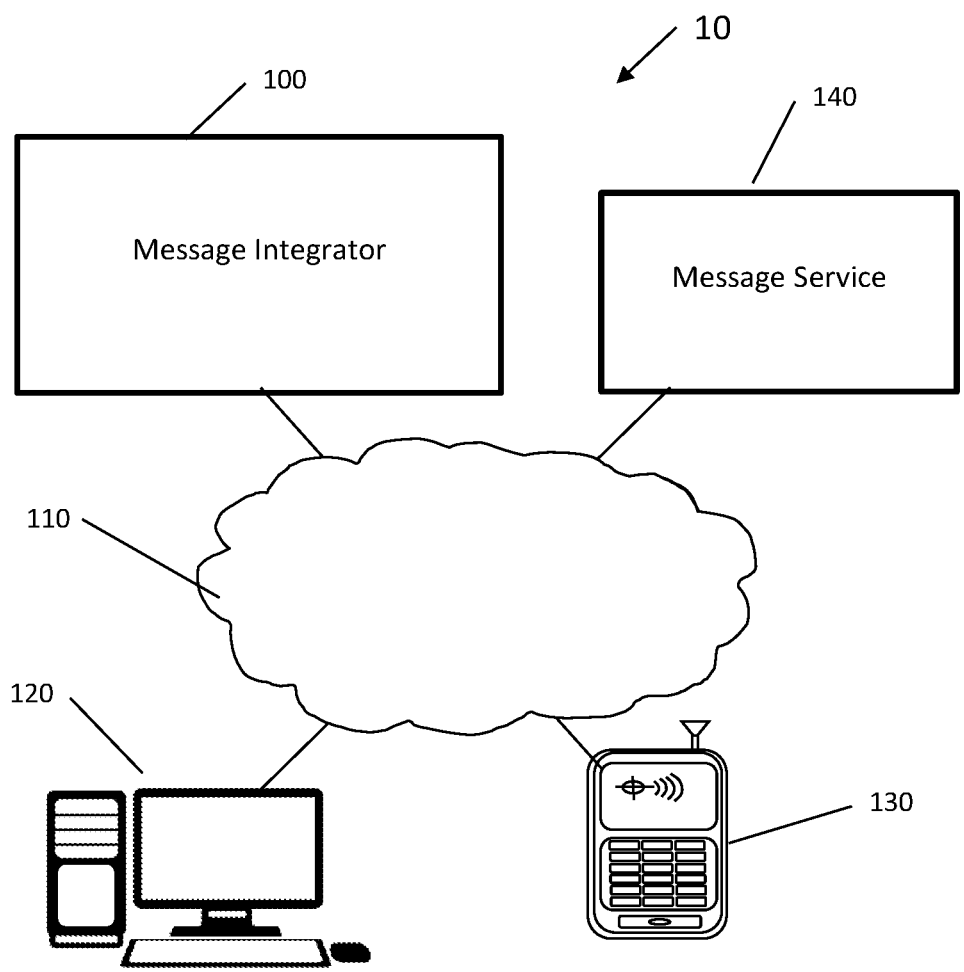
FIG. 1 shows, in simplified form, a representative system architecture.

FIG. 1 shows, in simplified form, a representative system architecture 10. The system architecture 10 comprises a message integrator 100 connected to cloud 110. Connected to the cloud 100 is at least one message service 140 and at least two user interfaces 120, 130.

The message integrator 100 comprises one or more processors, configured to run computer code; computer code; and one or more databases configured to store information. The message integrator 100 is configured to exchange information, including messages, via cloud 110, with the one or more message service 140 and the two or more user interfaces 120, 130, as well as to store and process data and to produce reports.

The system architecture 110 is represented as having at least two user interfaces 120, 130, which are able to exchange data via the cloud 110. At least one of the user interfaces is for the exchange of information by an Analyst, (not represented), and the other is for the exchange of information by a Tester (not represented).

Messages can be exchanged, through the message integrator 100, between the Analyst and Tester using the one or more interfaces 120, 130 via the cloud 110. Additionally, system messages may also be transmitted directly from the message integrator 100 to one or more of the Analysts or Testers using the one or more interfaces 120, 130 via the cloud 110. Examples of representative messages include but are not limited to SMS, email, voicemail, video messages, Tweets®, and instant messaging services.

Further, messages can also be exchanged between the Analyst and Tester using the one or more interfaces 120, 130, via the cloud 110, using the one or more messaging services 140. Examples of representative messages include but are not limited to SMS, email, voicemail, video messages, Tweets®, and instant messaging services.

Having described representative system architecture, we will now turn our attention to describing its use.

Figure 2:
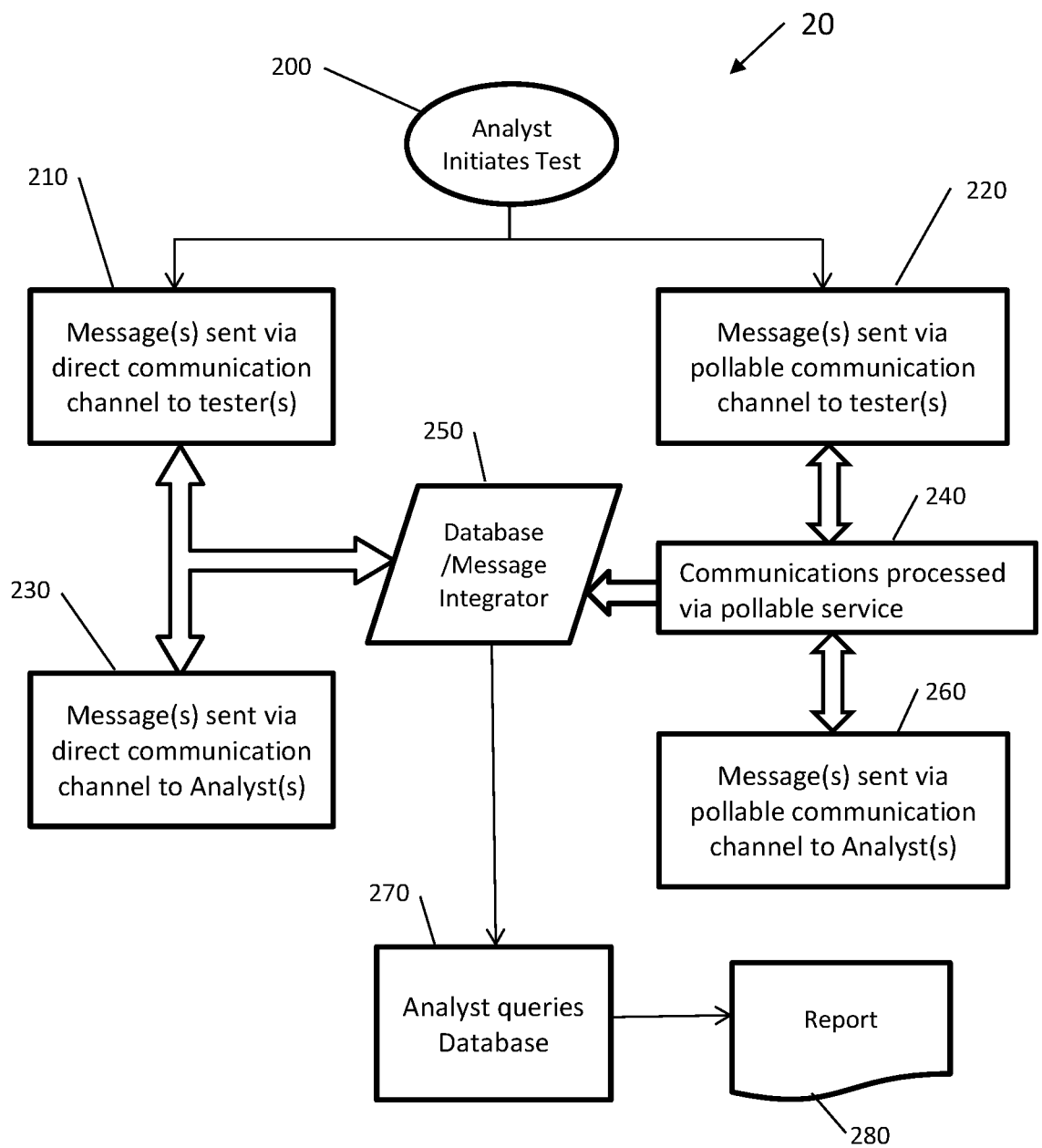
FIG. 2 shows, in simplified form, a representative method for integrating messaging.

FIG. 2 shows, in simplified form, a representative method 20 for integrating messaging.

The method 20 begins with an Analyst initiating a test [Step 200].

Once the test has been initiated, messages are exchanged between Analyst(s) (and/or the system) and Tester(s) follow one of two paths:

1) using direct communication channels: messages are sent via one or more direct communication channel(s) to the Tester(s) [Step 210] and messages are sent via one or more direct communication channel(s) to the Analyst(s) [Step 230] or 2) using pollable communication channels: messages are sent via one or more pollable communication channel(s) to the Tester(s) [Step 220] and messages are sent via one or more pollable communication channel(s) to the Analyst(s) [Step 260], after the communications are processed through a pollable communication service [Step 210].

A pollable communication service is one that the communications data related to messaging exchanged within it is available via API or other means. For example, you can use Twitter's® API to find out all the public messages sent to and from a particular address. However, you need one of the individual's user information to access messages exchanged privately. Similarly, you typically need the Analyst's (or Tester's) email account information to log in to the email exchange to pull email correspondence between an Analyst and Tester. Another example is voicemail where you typically a passcode to access an Analyst's (or Tester's) voicemail. Voicemail (or video messages) is interesting because it is a system where who the call is from may or may not be available. In such a case, a secondary process such as voice recognition (or image recognition) or even voice to text conversion can be used to determine who is speaking. The polling frequency can be occur at a fixed frequency, vary with time, or be individualized based on communication channel or even by Analysist.

It should be noted that the messages sent via direct communication channel(s) to Tester(s) [Step 210] and/or messages are sent via pollable communication channel(s) to Tester(s) [Step 220] can either be messages sent from either an Analyst or can be system messages. All of the parties: each Analyst, system, and each Tester must have a separate communication address on each communication channel, although they can have the same address on multiple channels. For instance, a phone number can be used for both SMS as well as voice messaging; however, the phone number is used uniquely for each communication channel. Additionally, many services allow the spoofing of messages, where the message that initiates from one address appears as if it came from another address. As such, messages can, for example, be initiated from the system that appear as if they are communications directly from the Analyst.

Examples of system messages include, but are not limited to: test initiation, test termination messages, survey available, survey completed, data missing, reports, parametric data from wearables, video and voice messages.

The types of messages include, but are not limited to: SMS, email, voicemail, video messages, Tweets®, and instant messaging services.

Messages sent via direct messaging [Step 210], [Step 230] will be stored within the database/message integrator 250 automatically and linked to the most recent test that a particular Analyst started with a particular Tester.

For example, if a First Analyst initiates a First Test with at least a first and second Tester . . . All of the messages communicated while the First Test is still open, between the First Analyst and either of the at least a first subject and second Tester, will be stored within the database/message integrator 250 and linked to the First Test.

If at a later time, the First Analyst initiates a Second Test, with the first Tester and at least a third Tester, then all new communication to the first Tester, as well as the third Tester, will be linked to the Second Test. However, as long as the First Test hasn't been closed, the communication between the Analyst and the second Tester can, depending on system settings, be stored and linked to the First Test, disregarded or processed as an error.

On the other hand, if at a later time, a Second Analyst initiates a Third Test with at least the first and second Tester, then all communication between the first Tester, as well as the third Tester, will be linked to the second test. All of the messages communicated while the Third Test is still open, between the Second Analyst and either of the at least a first subject and second Tester, will be stored within the database/message integrator 250 and linked to the Third Test.

The role of the database/message integrator 250 is to combine all of the messages into a single communication channel for example, instant messaging, which may/or may not be one of the communication channels used to communicate with one or more of the Testers.

Instant messaging is one of the simplest but highly effective forms of communication. It includes, date/time of the message, who the message was to/from and the message, which can often include attachments. It does not include things like a subject line, and fields like CC and BCC.

With respect to additional fields, the database/message integrator 250 can take one or more of the following representative actions: ignore/discard them; store them as additional data, available to the user as an attachment or the click of a button; inserted the data into the message (for example the subject line being inserted into the message as the first line of text), transpose the information (for example voice to text transcription; or do a combination of the above. The importance being not the particular action taken but that the information the Analysts needs (or typically needs) is available to them. The actions taken can be the same for all Analysts or individualized settings for one or more Analysts.

The final step is the Analyst queries the database [Step 270] and produces a report 280. The types of reports produce can include but are not limited to which messages contain (or exclude) a particular phrase, which messages came through on a particular communication channel, which Testers have not received a particular system message (e.g. survey completed or data missing messages), who communicated (or didn't communicate) over a certain period of time. The importance being not the particular type of query/report but that the information the Analysts needs (or typically needs) is available to them. The type of queries/reports available can be the same for all Analysts or individualized based upon settings for one or more Analysts.

Throughout this document the generic terms: Analysts, Test and Tester have been used. While, the system can be used for an Analysts that wants to have Testers in the field perform and provide feedback related to a specific test (e.g. garment fit, comfort of durability testing), the terms should be thought of more generally as well. Other examples include but are not limited to soliciting feedback from patients related to medical devices/prescriptions and law enforcement tip lines, were data comes from citizens.

Finally, it is to be understood that various different variants of the invention, including representative embodiments and extensions have been presented to assist in understanding the invention. It should be understood that such implementations are not to be considered limitations on either the invention or equivalents, except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed:

1. A method for integrating and storing communications data of differing electronic message type, said method comprising the acts of:

integrating at least a first and a second communication channel into a database by project name using a system comprising one or more processors, configured to run computer code;

computer code, configured to control the operations of said one or more system processors, for controlling the integrating communications data of differing electronic message types received from said at least a first and a second communication channel into a database by project name, each said at least first and second communications channel configured for sending and receiving messages of differing electronic message types;

and one or more databases, coupled to said one or more system processors and configured to store communications data of differing electronic message types received from said at least a first and a second communication channel into a database by project name, wherein the system is configured to exchange information, including messages, using said at least a first and a second communication channel, wherein the first communication channel is configured to send and receive communication data of a first message type and wherein the second communication channel is configured to send and receive communication data of a second message type different from said first message type;

wherein the act of integrating comprises:

initiating a first project name within a system, said first project name associated with a first analyst, by sending a first project initiation message on at least the first and second communication channel to at least a first and second communication system user, wherein the first analyst and the at least first and second communication system users each have a separate communication address on at least one of the first and second communication channels;

transmitting a copy of all the communication on the first communication channel between the first analyst and either of the at least first or second communication system users to the database and linking all of these communications with the first project name;

transmitting a copy of all the communication on the second communication channel between the first analyst and either of the at least first or second communication system user to the database and linking all of these communications with the first project name;

combining all of the integrated communication between the first analyst and the at least first or second communication system users concerning said first project name directly to the database communication data into a first analyst message stream viewable by the first analyst;

querying the first analyst message stream for data within the first Analyst message stream; and generating a report based upon the queried data.

2. The method of claim 1, wherein the act of combining includes storing, as part of the data, which of the at least first or second communication system users that each message is associated with.

3. The method of claim 1, wherein the act of combining includes storing, as part of the data, whether the message was directed to or from the first analyst.

4. The method of claim 1 wherein the act of combining includes storing, as part of the data, which of the at least the first and second communication channel was used for the message.

5. The method of claim 1, wherein the first analyst message stream utilizes the first communication channel.

6. The method of claim 5, wherein associated with at least the second communication channel is at least one piece of additional message related data that is not associated with the first communication channel and the act of combining includes storing, as part of the data, the additional message related data associated with the message from the at least the second communication channel.

7. The method of claim 1, further comprising the system periodically sending out messaging linked to the first project on at least one of the first or second communication channel to at least one of the first or second Testers and the combining further includes these messages.

8. The method of claim 1, wherein the combining includes storing, as part of the data, whether the message was directed to or from the system.

9. The method of claim 1 further comprising:

initiating a second project name within the system, associated with the first analyst, by sending a second project name initiation message on the at least one of the first and second communication channel to the first communication system user and at least a third communication system user, wherein the first analyst, the first communication system user and the at least a third communication system user each have a separate communication address on at least one of the first and second communication channels;

transmitting a copy of all new communication on the first communication channel between the first analyst and either of the first communication system user or the at least a third communication system user directly to the database and linking all of these communications with the second project name;

transmitting a copy of all new communication on the second communication channel between the first analyst and either of the first communication system user or the at least a third communication system user directly to the database and linking all of these communications with the second project name;

combining all of the linked communication data concerning the second project name into the first analyst message stream viewable by the first analyst;

querying the first analyst message stream for data by either first or second project name within the first analyst message stream; and generating a report based upon the queried data.

10. The method of claim 9 further comprising:

initiating a third project name within the system, associated with a second analyst, by sending a third project initiation message on at least one of the at least the first and second communication channel to the at least first communication system user and second communication system user, wherein the second Analyst, the at least first communication system user and second communication system user each have a separate communication address on at least one of the first and second communication channels;

transmitting a copy of all new communication on the first communication channel between the second analyst and either of the at least first communication system user or second communication system user directly to the database and linking all of these communications with the third project name;

transmitting a copy of all new communication on the second communication channel between the second analyst and either of the at least first communication system user or second communication system user directly to the database and linking all of these communications with the third project name;

combining all of the third project name linked communication data into a second analyst message stream viewable by the second analyst;

querying the second nalyst message stream for data within the second analyst message stream; and generating a report based upon the queried data.

11. The method of claim 9, wherein the combining includes storing, as part of the data, which of the at least first, second, or third Testers that each message is associated with.

12. The method of claim 9, wherein the combining includes storing, as part of the data, whether the message was directed to or from the first Analyst.

13. The method of claim 9, wherein the combining includes storing, as part of the data, which of the at least the first and second communication channel was used for the message.

14. The method of claim 9, wherein the first Analyst message stream in the first communication channel.

15. The method of claim 14, wherein associated with at least the second communication channel is at least one piece of additional message related data that is not associated with the first communication channel and the combining includes storing, as part of the data, the additional message related data associated with the message.

16. The method of claim 9 further comprising the system periodically sending out messaging linked to either the first or second project on at least one of the first or second communication channels to at least one of the first or second communication system users and the act of combining further includes combining these messages.

17. The method of claim 16, wherein the act of combining includes storing, as part of the data, whether the message was directed to or from the system.

* * * * *